(12) United States Patent
Abhinav et al.

(10) Patent No.: US 11,704,802 B2
(45) Date of Patent: Jul. 18, 2023

(54) MULTI-DIMENSIONAL MODEL MERGE FOR STYLE TRANSFER

(71) Applicant: Accenture Global Solutions Limited, Dublin (IE)

(72) Inventors: Kumar Abhinav, Hazaribag (IN); Suma Mani Kuriakose, Mumbai (IN); Alpana A. Dubey, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 331 days.

(21) Appl. No.: 17/091,324

(22) Filed: Nov. 6, 2020

(65) Prior Publication Data

US 2021/0142478 A1     May 13, 2021

Related U.S. Application Data

(60) Provisional application No. 62/931,857, filed on Nov. 7, 2019.

(51) Int. Cl.
| | | |
|---|---|---|
| *G06T 7/10* | (2017.01) | |
| *G06N 20/00* | (2019.01) | |
| *G06N 3/045* | (2023.01) | |

(52) U.S. Cl.
CPC .............. *G06T 7/10* (2017.01); *G06N 3/045* (2023.01); *G06N 20/00* (2019.01); *G06T 2207/20081* (2013.01); *G06T 2207/20084* (2013.01)

(58) Field of Classification Search
CPC .................. G06T 7/0014; G06T 15/08; G06T 2207/10072; G06T 2207/20076;
(Continued)

(56) References Cited

U.S. PATENT DOCUMENTS

| | | |
|---|---|---|
| 7,728,843 B2 | 6/2010 | Maillot et al. |
| 8,266,519 B2 | 9/2012 | Verma et al. |
| | (Continued) | |

FOREIGN PATENT DOCUMENTS

| | | |
|---|---|---|
| CN | 103443787 | 12/2013 |
| CN | 107436976 | 12/2017 |
| | (Continued) | |

OTHER PUBLICATIONS

Ahmed et al., "EPN: Edge-Aware PointNet for Object Recognition form Multi-View 2.5D Point Clouds," Proceedings of the IEEE/RSJ International Conference on Intelligent Robots and Systems, Nov. 3-8, 2019, Macau, China, 7 pages.

(Continued)

*Primary Examiner* — Ajibola A Akinyemi
(74) *Attorney, Agent, or Firm* — Fish & Richardson P.C.

(57) ABSTRACT

Implementations are directed to receiving a target object model representative of a target object, receiving a source object model representative of a source object, defining a set of target segments and a set of source segments using a segmentation machine learning (ML) model, for each target segment and source segment pair in a set of target segment and source segment pairs, generating a compatibility score representing a degree of similarity between a target segment and a source segment, the compatibility score calculated based on global feature representations of each of the target segment and the source segment, each global feature representation determined from a ML model, selecting a source segment for style transfer based on compatibility scores, and merging the source segment into the target object model to replace a respective target segment within the target object model and providing a stylized target object model.

27 Claims, 10 Drawing Sheets

(58) Field of Classification Search
CPC . G06T 2207/20128; G06T 2207/30024; G06T 2207/30101; G06T 7/174; G06T 7/337; G06T 2207/10024; G06T 2207/30004; G06T 7/62; G06T 2207/20081; G06T 7/11; G06T 17/00; G06T 2207/20084; G06T 2210/41; G06T 11/008; G06T 2207/10004; G06T 2210/12; G06T 7/0012; G06T 7/143; G06T 19/006
USPC .......................................................... 382/103
See application file for complete search history.

(56) References Cited

U.S. PATENT DOCUMENTS

| | | | |
|---|---|---|---|
| 8,271,870 | B2 | 9/2012 | Verma et al. |
| 8,412,516 | B2 | 4/2013 | Verma et al. |
| 8,442,985 | B2 | 5/2013 | Verma et al. |
| 8,566,731 | B2 | 10/2013 | Subramanian et al. |
| 8,671,101 | B2 | 3/2014 | Verma et al. |
| 8,677,313 | B2 | 3/2014 | Sharma et al. |
| 8,843,819 | B2 | 9/2014 | Verma et al. |
| 9,015,011 | B2 | 4/2015 | Sarkar et al. |
| 9,183,194 | B2 | 11/2015 | Verma et al. |
| 9,384,187 | B2 | 7/2016 | Verma et al. |
| 9,400,778 | B2 | 7/2016 | Ramani et al. |
| 9,519,986 | B1 | 12/2016 | Kolliopoulos et al. |
| 9,535,982 | B2 | 1/2017 | Verma et al. |
| 10,535,164 | B2 | 1/2020 | Shlens et al. |
| 10,769,764 | B2 | 9/2020 | Fang et al. |
| 10,950,021 | B2 | 3/2021 | Dubev et al. |
| 11,074,532 | B1 | 7/2021 | Kennell et al. |
| 11,244,484 | B2 | 2/2022 | Dubey et al. |
| 11,455,552 | B2 | 9/2022 | Liongosari et al. |
| 2006/0173874 | A1 | 8/2006 | Chen et al. |
| 2011/0123100 | A1 | 5/2011 | Carroll et al. |
| 2014/0351694 | A1 | 11/2014 | Verma et al. |
| 2016/0165012 | A1* | 6/2016 | Li ..................... H03M 7/3064 709/247 |
| 2016/0300252 | A1 | 10/2016 | Frank et al. |
| 2017/0076179 | A1 | 3/2017 | Martineau et al. |
| 2017/0116373 | A1 | 4/2017 | Ginsburg et al. |
| 2018/0075104 | A1 | 3/2018 | Oberbreckling et al. |
| 2018/0075602 | A1 | 3/2018 | Shen et al. |
| 2018/0082715 | A1 | 3/2018 | Rymkowski et al. |
| 2018/0146257 | A1 | 5/2018 | Seo et al. |
| 2019/0114699 | A1 | 4/2019 | Cook et al. |
| 2019/0228587 | A1 | 7/2019 | Mordvintsev et al. |
| 2019/0236814 | A1 | 8/2019 | Shlens et al. |
| 2019/0244329 | A1 | 8/2019 | Li et al. |
| 2019/0251616 | A1 | 8/2019 | Yankovich et al. |
| 2019/0259470 | A1 | 8/2019 | Olafson et al. |
| 2019/0318222 | A1 | 10/2019 | Mallela |
| 2019/0325008 | A1 | 10/2019 | Dubey et al. |
| 2019/0325088 | A1 | 10/2019 | Dubey et al. |
| 2019/0325628 | A1 | 10/2019 | Dubey et al. |
| 2019/0392192 | A1 | 12/2019 | Dubey et al. |
| 2020/0082578 | A1 | 3/2020 | Shlens et al. |
| 2020/0090318 | A1 | 3/2020 | Azoulay et al. |
| 2020/0117348 | A1 | 4/2020 | Jang et al. |
| 2020/0130936 | A1 | 4/2020 | Shekhawat et al. |
| 2020/0151521 | A1 | 5/2020 | Almazan et al. |
| 2020/0193222 | A1 | 6/2020 | Singh et al. |
| 2020/0219111 | A1 | 7/2020 | Nair et al. |
| 2020/0226651 | A1 | 7/2020 | Rachidi et al. |
| 2020/0242111 | A1 | 7/2020 | Oberbreckling et al. |
| 2020/0250557 | A1 | 8/2020 | Kishimoto et al. |
| 2020/0312042 | A1 | 10/2020 | Sardari et al. |
| 2020/0320288 | A1* | 10/2020 | Kunnumma ............ G06V 40/33 |
| 2020/0365239 | A1 | 11/2020 | Sabharwal et al. |
| 2021/0158180 | A1 | 5/2021 | Liongosari et al. |
| 2021/0264520 | A1 | 8/2021 | Cummings |
| 2021/0279967 | A1* | 9/2021 | Gernoth ................. G06F 9/453 |
| 2021/0319039 | A1 | 10/2021 | Gerber, Jr. et al. |
| 2021/0319173 | A1 | 10/2021 | Gerber, Jr. et al. |
| 2021/0365488 | A1 | 11/2021 | Chen et al. |
| 2021/0365599 | A1 | 11/2021 | Martelaro et al. |
| 2022/0122173 | A1 | 4/2022 | Lopatin et al. |
| 2022/0245510 | A1 | 8/2022 | Abhinav et al. |
| 2022/0245908 | A1 | 8/2022 | Abhinav et al. |

FOREIGN PATENT DOCUMENTS

| | | |
|---|---|---|
| EP | 2081118 | 7/2009 |
| EP | 2296094 | 3/2011 |
| EP | 2362333 | 8/2011 |
| WO | WO 2012106133 | 8/2012 |

OTHER PUBLICATIONS

Chang et al., "ShapeNet: An Information-Rich 3D Model Repository," arXiv, Dec. 9, 2015, arXiv:1512.03012v1, 11 pages.

He et al., "GeoNet: Deep Geodesic Networks for Point Cloud Analysis," arXiv, Jan. 3, 2019, arXiv:1901.00680v1, 11 pages.

Mazeika et al., "Towards 3D Neural Style Transfer," Proceedings of the AAAI Conference on Artificial Intelligence and Interactive Digital Entertainment, Nov. 13-17, 2018, Edmonton, Alberta, Canada, 7 pages.

PointClouds.org [online], "pcl::StatisticalOutlierRemoval< PointT > Class Template Reference," available on or before Aug. 8, 2020, via Internet Archive: Wayback Machine URL<https://web.archive.org/web/20200808065826/https://pointclouds.org/documentation/classpcl_1_1_statistical_outlier_removal.html>, retrieved on Feb. 4, 2021, retrieved from URL<https://pointclouds.org/documentation/classpcl_1_1_statistical_outlier_removal.html>, 7 pages.

PointClouds.org [online], "radius_outlier_removal.h," upon information and belief, available no later than Dec. 17, 2020, retrieved on Feb. 4, 2021, retrieved from URL<https://pointclouds.org/documentation/radius_outlier_removal_8h_source.html>, 5 pages.

Qi et al., "PointNet++: Deep Hierarchical Feature Learning on Point Sets in a Metric Space," arXiv, Jun. 7, 2017, arXiv:1706.02413v1, 14 pages.

Pinquie, Romain et al., "A Property Graph Data Model for a Context-Aware Design Assistant", Feb. 2020. (Year: 2020).

Yan, Hehua et al., "KnowIME: A System to Construct a Knowledge Graph for Intelligent Manufacturing Equipment", Mar. 11, 2020, Advances in Machine Learning and Cognitive Computing for Industry Applications, IEEE Access. (Year: 2020).

Anny Yuniarti, Nanik Suciati, "A Review of Deep Learning Techniques for 3D Reconstruction of 2D Images", 2019, IEEE (Year: 2019).

Feng et al., "MeshNet: Mesh Neural Network for 3D Shape Representation," arXiv, Nov. 28, 2018, arXiv:1811.11424v1, 9 pages.

Gatys et al., "A Neural Algorithm of Artistic Style," arXiv, Aug. 26, 2015, arXiv:1508.06576v1, 16 pages.

Hanocka et al., "MeshCNN: A Network with an Edge," ACM Trans. Graphics, Feb. 2019, 1(1):90, 12 pages.

Li et al., "A closed-form solution to photorealistic image stylization," The European Conference on Computer Vision (ECCV), Munich, Germany, Sep. 8-14, 2018, 23 pages.

Mo et al., "PartNet: A Large-scale Benchmark for Fine-grained and Hierarchical Part-level 3D Object Understanding," Proceedings of the 2019 IEEE/CVF Conference on Computer Vision and Pattern Recognition (CPVR), Jun. 16-20, 2019, Long Beach, California, USA, 909-918.

Pham et al., "SceneCut: Joint Geometric and Object Segmentation for Indoor Scenes", May 24, 2018, arXiv:1709.07158v2, 8 pages.

Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.

Qi et al., "PointNet: Deep Learning on Point Sets for 3D Classification and Segmentation," arXiv, Apr. 10, 2017, arXiv:1612.00593v2, 19 pages.

Szegedy et al., "Going deeper with convolutions," arXiv, Sep. 17, 2014, arXiv:1409.4842v1, 12 pages.

(56) References Cited

OTHER PUBLICATIONS

Szegedy et al., "Inception-v4, Inception-ResNet and the Impact of Residual Connections on Learning," arXiv, Aug. 23, 2016, arXiv:1602.07261v2, 12 pages.
Szegedy et al., "Rethinking the Inception Architecture for Computer Vision," arXiv, Dec. 11, 2015, arXiv:1512.00567v3, 10 pages.
Wu et al., "3D ShapeNets: A Deep Representation for Volumetric Shapes," Proceedings of the 2015 IEEE Conference on Computer Vision and Pattern Recognition (CPVR), Jun. 7-12, 2015, Boston, Massachusetts, USA, 1912-1920.
Cao et al., "Neural Style Transfer for Point Clouds", 2019, arXiv (Year: 2019).
Gatesy et al. "Scientific Rotoscoping: A Morphology-Based Method of 3-D Motion Analysis and Visualization", 2010, Wiley-Liss, Inc. (Year: 2010).
Miranda Nicole Shaw, "Lumbar Spine Endplate Biomechanics: An Experimental and Modeling Aproach", 2010, ProQuest LLC (Year: 2010).
Teimoourzadeh et al., "three-dimensional group search optimization approach for simultaneous planning of distributed generation units and distribution network reconfiguration", 2019, Applied Soft Computing Journal (Year: 2019).

\* cited by examiner

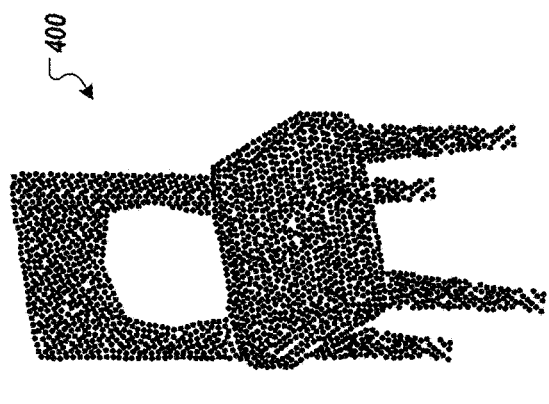
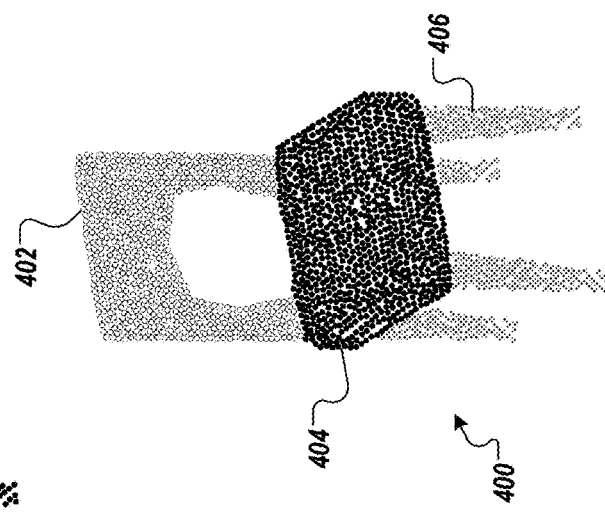
FIG. 4A
FIG. 4B
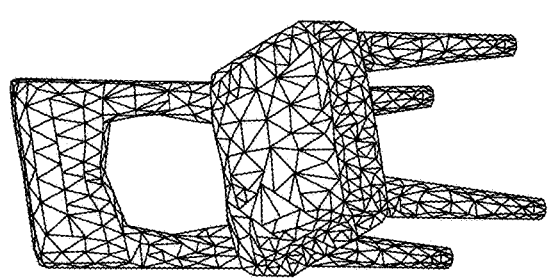
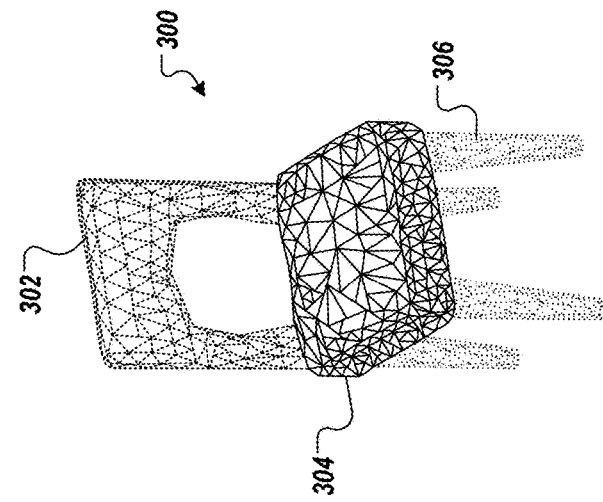
FIG. 3A
FIG. 3B

MULTI-DIMENSIONAL MODEL MERGE FOR STYLE TRANSFER

CROSS-REFERENCE TO RELATED APPLICATION

This application claims the benefit of and priority to U.S. Prov. App. No. 62/931,857 filed on Nov. 7, 2019, which is expressly incorporated herein by reference in the entirety for all purposes.

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase. In the design phase, a product is designed. Example products can include individual objects (e.g., chair, couch, table) and spaces (e.g., room, vehicle interior). Designs can include wholly original designs, combinations of existing designs, and derivatives of existing designs.

In modern design processes, much of the design process is performed using computers and design information stored as data (e.g., multi-dimensional models, images). For example, a designer can use computer-executable design tools to generate designs represented in digital files (e.g., model files, image files). The design process, however, can be a tedious, iterative process as the designer seeks to capture an appealing design. This can include both the shape of objects as well as styles applied to objects. Consequently, the design process can place a significant demand on resources, such as processors and memory, as the designer iterates over multiple designs.

SUMMARY

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional model merging for style transfer that enables a style of a source object to be at least partially applied to a target object. In some examples, the style transfer includes applying at least a portion of a shape of the source object to the target object. In some examples, the source object is represented as a multi-dimensional source object model and the target object is represented as a multi-dimensional target object model. In some examples, at least a portion of the style of the source object, as represented in the multi-dimensional source object model, is applied in the multi-dimensional target object model. In some implementations, the intelligent design platform of the present disclosure also includes multi-dimensional style transfer that enables a style of a source image to be at least partially applied to a target object.

In some implementations, actions include receiving a target object model including data representative of a target object, receiving a source object model including data representative of a source object, defining a set of target segments by processing the target object model through a segmentation machine learning (ML) model, and a set of source segments by processing the source object model through the segmentation ML model, for each target segment and source segment pair in a set of target segment and source segment pairs, generating a compatibility score that represents a degree of similarity between a target segment and a source segment of a respective target segment and source segment pair, the compatibility score calculated based on a global feature representation of the target segment and a global feature representation of the source segment of the respective target segment and source segment pair, each global feature representation determined from a ML model, selecting at least one source segment for style transfer based on compatibility scores, and merging the at least one source segment into the target object model to replace a respective at least one target segment within the target object model and providing a stylized target object model. Implementations of the present disclosure also include corresponding systems, apparatus, and computer programs, configured to perform the actions of the methods, encoded on computer storage devices.

These and other implementations can each optionally include one or more of the following features: the target object model and the source object model are provided as mesh models, the segmentation ML model includes MeshCNN, and the ML model includes MeshNet; the target object model and the source object model are provided as point cloud models, the segmentation ML model includes PointNet, and the ML model includes a portion of PointNet; compatibility scores are each determined as a chamfer distance between the global feature representation of the target segment and the global feature representation of the source segment of the respective target segment and source segment pair; compatibility scores are each determined using a Siamese network that processes the global feature representation of the target segment and the global feature representation of the source segment of the respective target segment and source segment pair; selecting at least one source segment for style transfer based on compatibility scores includes providing a compatibility matrix for display to a user in a user interface, and receiving user input indicating selection of the at least one source segment; selecting at least one source segment for style transfer based on compatibility scores includes comparing each compatibility score to one or more thresholds to effect respective comparisons, the at least one source segment being automatically selected based on a comparison; actions further include determining a stylized image from a target image and a style image based on content loss and style loss, and selectively applying the stylized image to one or more of the target object model and the stylized target object model; and determining a stylized image from a target image and a style image include, for each iteration of multiple iterations, generating a target image feature representation using a first inception network, generating a source image feature representation using a second inception network, determining a total loss based on the content loss and the style loss determined based on the target image feature representation and the source image feature representation, and selectively executing a next iteration based on the total loss, the next iteration including adjusting one or more parameters of one or more of the first inception network and the second inception network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A and 3B depict example mesh representations of an example object.

FIGS. 4A and 4B depict example point cloud representations of an example object.

Like reference symbols in the various drawings indicate like elements.

DETAILED DESCRIPTION

Figure 1:
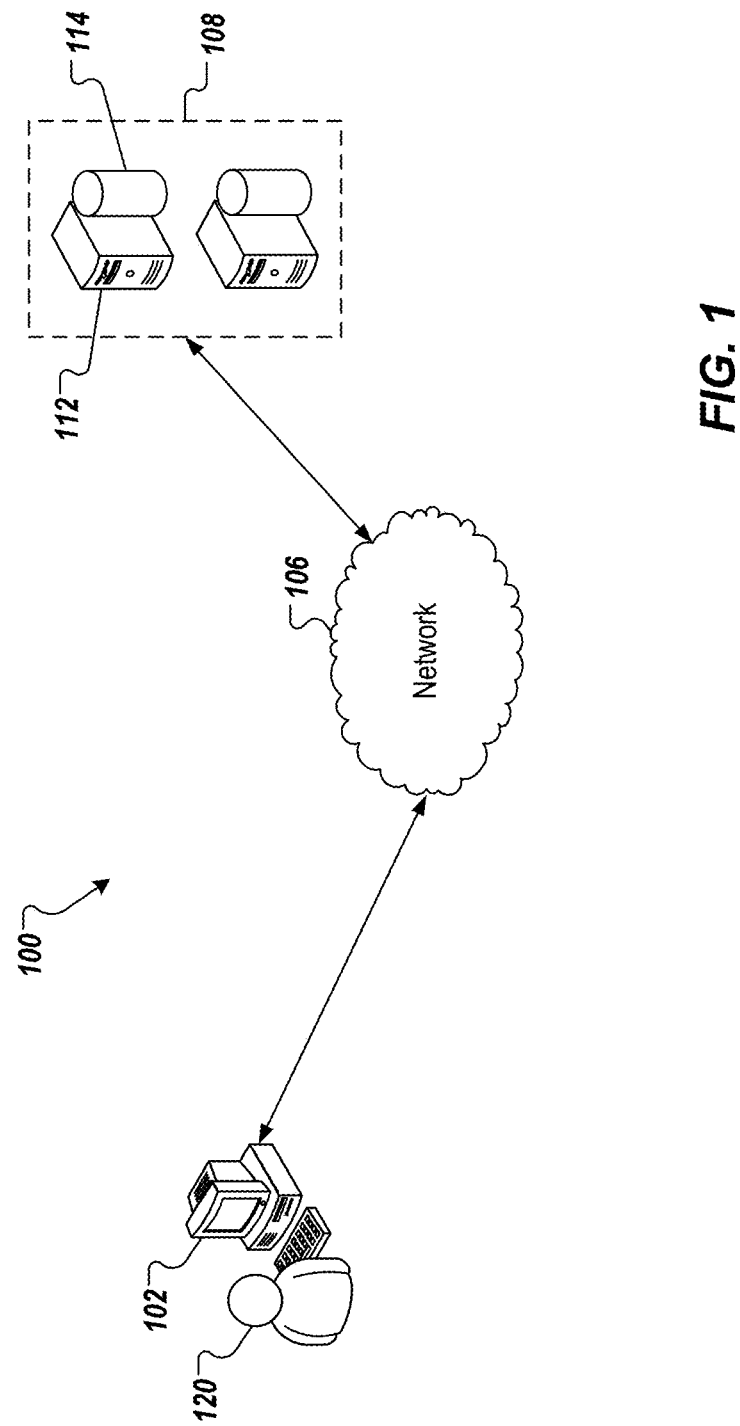
FIG. 1 depicts an example system that can execute implementations of the present disclosure.

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional style transfer that enables a style of a source object to be at least partially applied to a target object. In some examples, the style transfer includes applying at least a portion of a shape of the source object to the target object. In some examples, the source object is represented as a multi-dimensional source object model and the target object is represented as a multi-dimensional target object model. In some examples, at least a portion of the style of the source object, as represented in the multi-dimensional source object model, is applied in the multi-dimensional target object model. In some implementations, the intelligent design platform of the present disclosure also includes multi-dimensional style transfer that enables a style of a source image to be at least partially applied to the target object.

In some implementations, actions include receiving a target object model including data representative of a target object, receiving a source object model including data representative of a source object, defining a set of target segments by processing the target object model through a segmentation machine learning (ML) model, and a set of source segments by processing the source object model through the segmentation ML model, for each target segment and source segment pair in a set of target segment and source segment pairs, generating a compatibility score that represents a degree of similarity between a target segment and a source segment of a respective target segment and source segment pair, the compatibility score calculated based on a global feature representation of the target segment and a global feature representation of the source segment of the respective target segment and source segment pair, each global feature representation determined from a ML model, selecting at least one source segment for style transfer based on compatibility scores, and merging the at least one source segment into the target object model to replace a respective at least one target segment within the target object model and providing a stylized target object model.

To provide context for implementations of the present disclosure, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In each instance, the design process is iterative. For example, iterations of designs are provided, each iteration including changes to an earlier design. Inefficiencies are introduced, as the number of iterations increases. That is, for example, at each iteration, designers spend time, and resources (e.g., computing resources) to refine the design. Current design processes lack tools to reduce the number of iterations and increase the efficiency of the design process.

In view of this, implementations of the present disclosure provide a computer-implemented intelligent design platform for assisting in design phases of products. In some implementations, the intelligent design platform of the present disclosure includes multi-dimensional style transfer that enables a style of a source object to be at least partially applied to a target object. In some examples, the style transfer includes applying at least a portion of a shape of the source object to the target object. In some examples, the source object is represented as a multi-dimensional source object model (also referred to herein as a source object model) and the target object is represented as a multi-dimensional target object model (also referred to herein as a target object model). In some examples, each of the target object model and the source object model can be represented as a multi-dimensional mesh. In some examples, each of the target object model and the source object model can be represented as a multi-dimensional point cloud. In some examples, at least a portion of the style of the source object, as represented in the source object model, is applied in the target object model. As described herein, the multi-dimensional style transfer is executed using one or more machine-learning (ML) models.

In some implementations, multi-dimensional style transfer includes segmenting the target object model to provide a set of target segments and segmenting the source object model to provide a set of source segments. In some implementations, segmentation of each of the target object model and the source object model is performed using a ML model that processes each of the target object model and the source object model individually to identify segments therein. For example, if the target object model represents a chair, segmentation can be performed to identify example segments of a back, a seat, and legs of the chair. As another example, if the source object model represents a chair, segmentation can be performed to identify example segments of a back, a seat, and legs of the chair.

In some implementations, target segments in the set of target segments are compared to source segments in the set of source segments to determine compatibility scores for respective target segment and source segment pairs. In some examples, a compatibility score represents a degree of compatibility between the target segment and the source segment of the respective pair. In some implementations, the compatibility between a target segment and a source segment is determined by providing a global feature representation for each of the target segment and the source segment using at least part of a classification ML model and calculating a loss value based on the global feature representation. In some examples, the loss value is provided as the compatibility score for the respective target segment and source segment pair. An example global feature representation includes, without limitation, a global feature vector (GFV), which is referenced hereinafter for purposes of non-limiting illustration.

In some implementations, multi-dimensional style transfer includes replacing one or more target segments of the target object model with one or more source segments of the source object model. In some examples, a target segment and a source segment pair is selected and the target segment is replaced by the source segment within the target object model. In some examples, compatibility scores are displayed to a user and user input is received indicating selection of a target segment and a source segment pair for multi-dimensional style transfer. In some examples, a target segment and a source segment pair is automatically selected for multi-dimensional style transfer based on compatibility score. For example, if the compatibility score of a target segment and a source segment pair exceeds a threshold compatibility score, the target segment and the source segment pair is automatically selected for multi-dimensional style transfer.

In some implementations, a stylized target object model is provided by merging one or more source segments into the target object model. For example, for each target segment and source segment pair that is selected, the target segment of the pair is replaced with the source segment of the pair in the target object model to provide the stylized target object model.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of an intelligent design platform in accordance with implementations of the present disclosure.

In some examples, the back-end system 108 hosts an intelligent design platform that provides multi-dimensional style transfer in accordance with implementations of the present disclosure. For example, a user 120 (e.g., a designer) can interact with the intelligent design platform using the computing device 102. In some examples, the user 120 can provide a target object model and a source object model, which can be processed to provide a stylized target object model by merging at least one segment of the source object model into the target object model, as described in further detail herein. In some examples, the user 120 can provide a target object model and a source image, which can be processed to provide a stylized target object model by applying a style of the source image to the target object model, as described in further detail herein.

Figure 2:
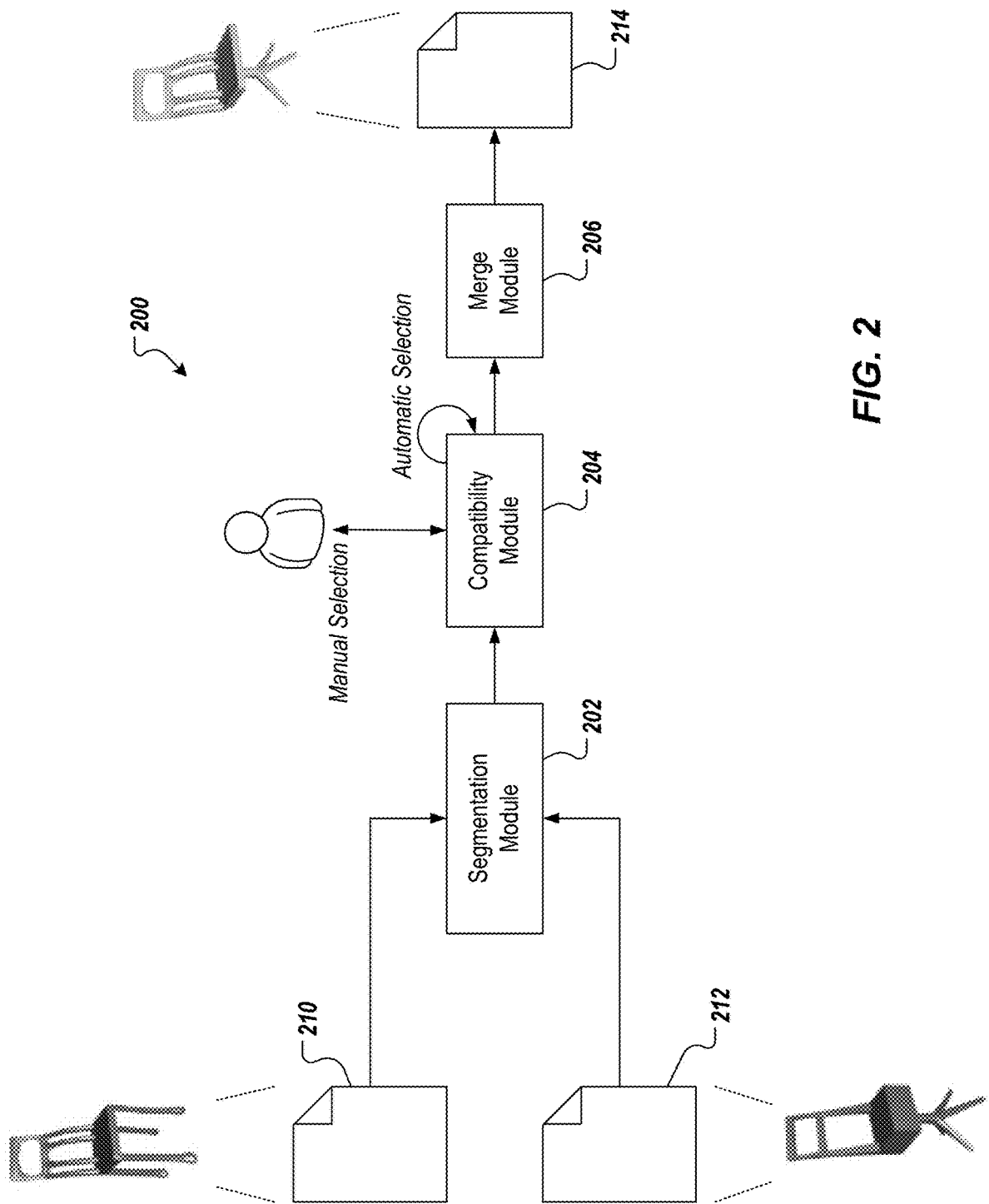
FIG. 2 depicts a conceptual architecture for multi-dimensional style transfer in accordance with implementations of the present disclosure.

FIG. 2 depicts an example conceptual architecture 200 for multi-dimensional style transfer in accordance with implementations of the present disclosure. The example conceptual architecture 200 can be part of an intelligent design platform and represents multi-dimensional style transfer through merging one or more shapes. The example conceptual architecture 200 of FIG. 2 includes a segmentation module 202, a compatibility module 204, and a merge module 206. As described in further detail herein, a target object model 210 and a source object model 212 are provided as input and a stylized target object model 214 is provided as output. In some examples, the target object model 210, the source object model 212, and the stylized target object model 214 are each digitally represented within a respective computer-readable file, which can be processed through the conceptual architecture 200. In some examples, the target object model 210, the source object model 212, and the stylized target object model 214 are each provided as mesh models, described in further detail herein. In some examples, the target object model 210, the source object model 212, and the stylized target object model 214 are each provided as point cloud models, described in further detail herein.

In some implementations, the segmentation module 202 individually processes each of the target object model 210 and the source object model 212 to provide a set of target segments and a set of source segments, respectively. In some examples, the segmentation module 202 executes a segmentation ML model, through which an object model is processed to define a set of segments from the object model. In some examples, each segment can be described as a sub-component of the object represented within the object model. Example segmentation ML models include, without limitation, MeshCNN and PointNet, each of which is described in further detail herein.

In some implementations, and as noted above, the target object model 210 and the source object model 212 can each be provided as a mesh model. In general, a mesh model can be described as a multi-dimensional mesh representation of an object that includes a mesh of interconnected polygons (e.g., triangles), each shape representing a face of the object. More particularly, a mesh model is represented as mesh data that includes sets of vertices, edges, and faces, where vertices are connected with edges and closed sets of edges form faces. In some examples, the faces are polygons, such as triangles. Implementations of the present disclosure are described in further detail herein with non-limiting reference to triangles. In some examples, the mesh model includes a set of n faces, and each face is defined as a set of initial values. In some examples, the set of initial values includes face information and neighbor information. Examples of face information include center (e.g., coordinates [x, y, z] of the center point), corner (e.g., vectors from the center point to each vertex), and normal (e.g., unit normal vector). Example neighbor information includes neighbor index (e.g., indexes of connected faces).

FIGS. 3A and 3B depict example mesh representations of an example object 300. While the example object 300 is depicted as a chair, implementations of the present disclosure are applicable to any object that can be modeled.

In some implementations, and as noted above, the target object model 210 and the source object model 212 can each be provided as a point cloud model. In general, a point cloud model can be described as a multi-dimensional point representation of an object that includes a set of n points defined by a coordinate system. In some examples, each point is represented by coordinates (e.g., [x, y, z]). In some examples, additional dimensions can be added to the representation of each point by, for example, determining normals, local features (e.g., color channels (RGB)), and/or global features.

FIGS. 4A and 4B depict example point cloud representations of an example object 400. While the example object 400 is depicted as a chair, implementations of the present disclosure are applicable to any object that can be modeled.

In some implementations, if the target object model 210 and the source object model 212 are each provided as mesh models, the segmentation module 202 segments each using MeshCNN, which is described in detail in *MeshCNN: A Network with an Edge*, Hanocka et al., Feb. 13, 2019 ("Hanocka"), which is expressly incorporated herein by reference in the entirety. In general, MeshCNN can be described as a mesh convolution neural network (CNN) that combines specialized convolution and pooling layers, which leverage intrinsic geodesic connections between mesh edges. For example, and as discussed in Hanocka, MeshCNN generates new mesh connectivity for subsequent convolutions by applying a convolution on edges of a face and edges of incident faces and by applying pooling through an edge collapse operation that retains surface topology. In some implementations, MeshCNN is trained during a training phase using at least a portion of the PartNet dataset, which is described in *PartNet: A Large-scale Benchmark for Fine-grained and Hierarchical Part-level 3D Object Understanding*, Mo et al., Dec. 6, 2018 ("Mo"), which is expressly incorporated herein by reference in the entirety.

For example, and with reference to FIGS. 3A and 3B, the example object 300 can be processed through MeshCNN to identify segments of the example object 300. With particular reference to FIG. 3B, a segment 302 (e.g., seat back), a segment 304 (e.g., seat), and a segment 306 (e.g., legs, collectively) are determined by processing the example object 300 through MeshCNN.

In some implementations, if the target object model 210 and the source object model 212 are each provided as point clouds, the segmentation module 202 segments each using PointNet, which is described in detail in *PointNet: Deep Learning on Point Sets for 3D Classification and Segmentation*, Qi et al., Apr. 10, 2017 ("Qi"), which is expressly incorporated herein by reference in the entirety. In some implementations, PointNet is trained using at least one of ShapeNet and ModelNet40. ShapeNet is described in detail in Wu et al., 3d shapenets: A deep representation for volumetric shapes, *Proceedings of the IEEE Conference on Computer Vision and Pattern Recognition, pages* 1912-1920, 2015, which is expressly incorporated herein by reference in the entirety. ModelNet40 is available at https://modelnet.cs.princeton.edu/download.html.

Figure 5:
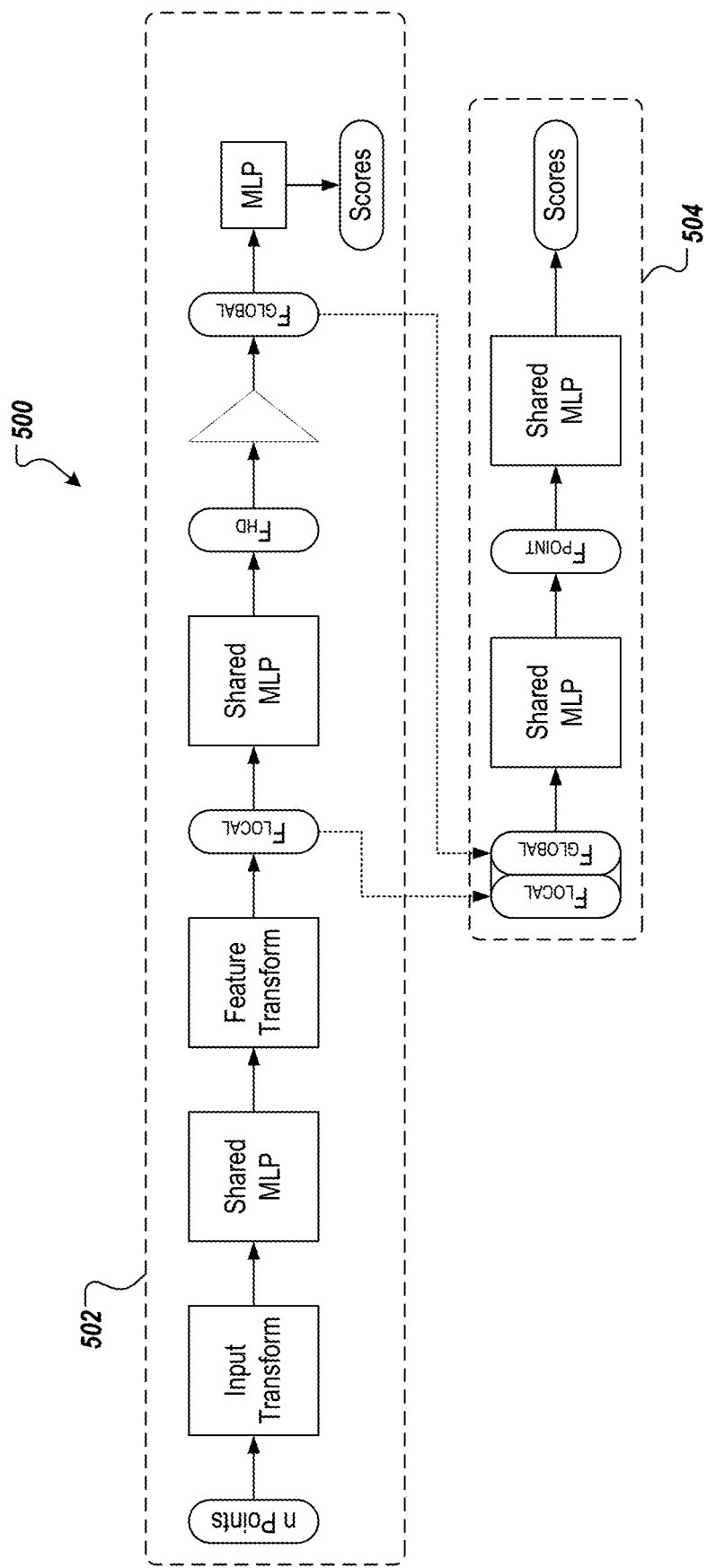
FIG. 5 depicts an architecture of a first example ML model for segmentation.

FIG. 5 depicts an architecture 500 of PointNet. In general, PointNet includes a classification network 502 and a segmentation network 504. Qi describes that the classification network 502 takes n points as input, applies input and feature transformations, and aggregates point features by max pooling, and the output is classification scores for k classes. For example, and with reference to FIG. 4A, a classification score can be output by the classification network 502 and can indicate that the example object 400 belongs to a class 'chair' among other potential classes having lower classification scores. Qi also describes that segmentation is treated as a per-point classification problem (e.g., classifying each point as belonging to a particular segment). To this end, the segmentation network 504 is described as an extension to the classification network 502, and that the segmentation network 504 concatenates global features (represented in a global feature vector ($F_{GLOBAL}$)) and local features (represented in a local feature vector ($F_{LOCAL}$)) and outputs per point scores, which represent a segmentation label (class) indicating a segment that each point belongs to.

For example, and with reference to FIGS. 4A and 4B, the example object 400 can be processed through PointNet to identify segments of the example object 400. With particular reference to FIG. 4B, a segment 402 (e.g., seat back), a segment 404 (e.g., seat), and a segment 406 (e.g., legs, collectively) are determined by processing the example object 400 through PointNet.

Referring again to FIG. 2, and in accordance with implementations of the present disclosure, output of the segmentation module 202 includes a set of target segments (determined from the target object model) and a set of source segments (determined from the source object model). In some examples, each segment is itself an object model. For example, each segment is provided as a segment model that is a portion of the object model, from which the segment is identified. In some examples, target segments in the set of target segments are each provided as a target segment object model, and source segments in the set of source segments are each provided as a source segment object model.

In some implementations, the compatibility module 204 compares object models and provides one or more sets of compatibility scores. In some examples, the compatibility module 204 compares target segments in the set of target segments to source segments in the set of source segments and provides a set of compatibility scores (e.g., segment-to-segment compatibility scores, each representing a degree of similarity between a target segment and a source segment). In some examples, the compatibility module 204 compares the target object to segments in the set of source segments and provides a set of compatibility scores (e.g., object-to-segment compatibility scores, each representing a degree of similarity between the target object and a source segment). In some examples, the compatibility module 204 compares the source object to segments in the set of target segments and provides a set of compatibility scores (e.g., object-to-segment compatibility scores, each representing a degree of similarity between the source object and a target segment). In some examples, the compatibility module 204 compares the target object to the source object and provides a compatibility score (e.g., an object-to-object compatibility score representing a degree of similarity between the target object and the source object).

With regard to compatibility scores as between target segments and source segments, each compatibility score corresponds to a target segment and source segment pair and represents a degree of similarity between the target segment and the source segment in the target segment and source segment pair. More particularly, each segment is processed through a ML model to determine segment features, and segment features between a target segment and a source segment in a pair are compared to determine the compatibility score. In some examples, and as described in further detail herein, the segment features of each segment are represented in a global feature vector, and the compatibility score is determined based on a loss between the segment features of the target segment and the segment features of the source segment, which is calculated based on the respective global feature vectors (i.e., the global feature vector of the target segment and the global feature vector of the source segment).

In some implementations, if the target object model 210 and the source object model 212, are each provided as mesh models, and thus, segments in the respective sets of segments are also provided as mesh models, the compatibility module 204 determines global feature vectors (representing segment features) using MeshNet, which is described in detail in *MeshNet: Mesh Neural Network for 3D Shape Representation*, Feng et al., Nov. 28, 2018 ("Feng"), which is expressly incorporated herein by reference in the entirety. That is, each segment model is processed through MeshNet to provide segment features, which are represented in a global feature vector for the respective segment. In general, Feng describes MeshNet as a mesh neural network that learns on mesh data directly for 3D shape representation, and that faces are regarded as the unit and connections between faces sharing common edges are defined (e.g., as discussed above).

Figure 6:
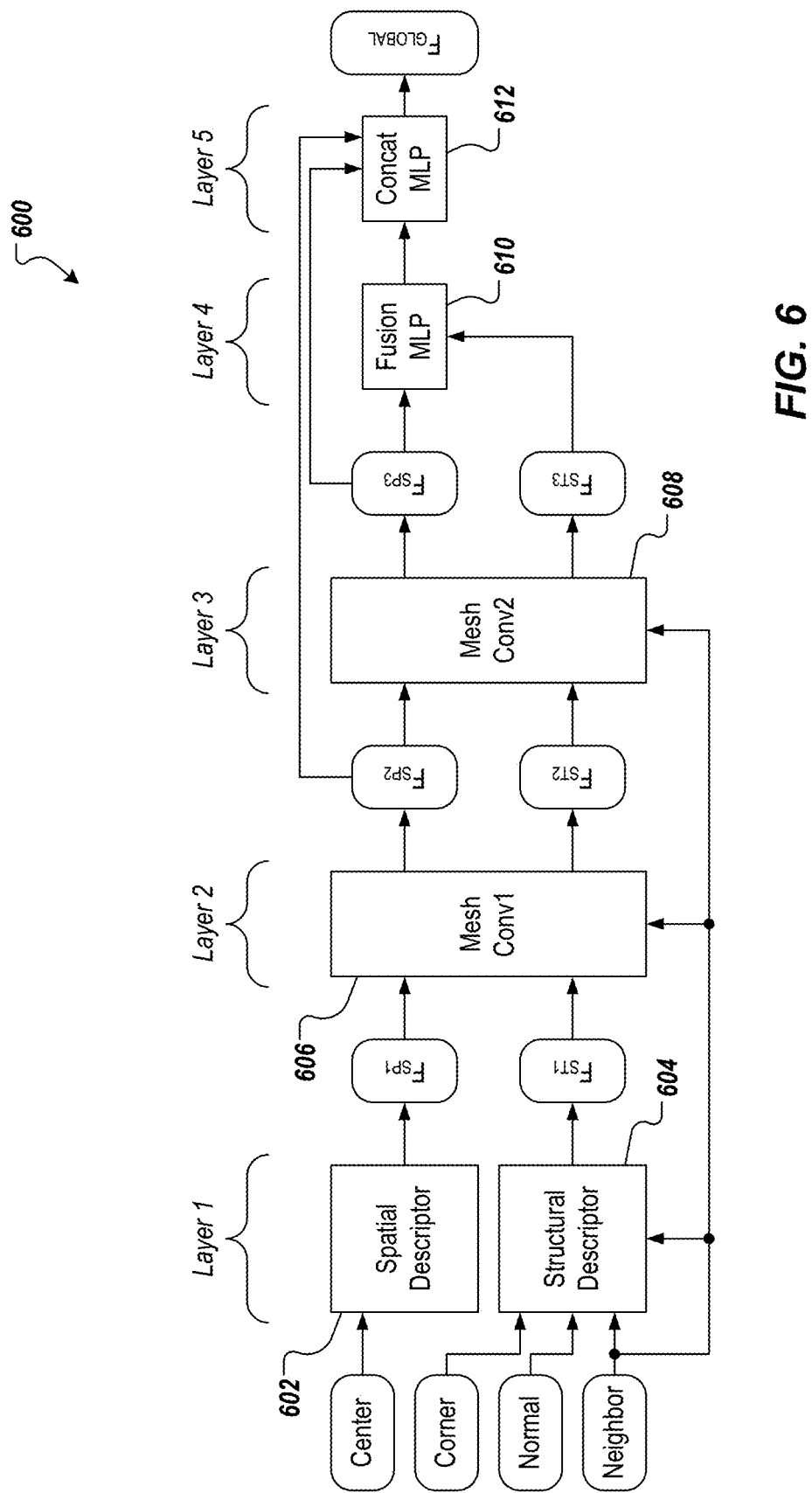
FIG. 6 depicts an architecture of a second example ML model for segmentation.

FIG. 6 depicts an architecture 600 of MeshNet. As depicted in FIG. 6, the architecture 600 includes a first layer (Layer 1) having a special descriptor 602 and a structural descriptor 604. Input to MeshNet is, for a respective segment, a set of faces and a set of initial values (e.g., as discussed above) for each face in the set of faces. As depicted in FIG. 6, a set of centers (e.g., coordinates [x, y, z] of the center point for each face) is provided as input to the spatial descriptor 602. In some examples, the spatial descriptor 602 applies a shared multi-layer-perceptron (MLP) to the center of each and outputs a first set of spatial feature vectors ($F_{SP1}$). As also depicted in FIG. 6, sets of corners (e.g., vectors from the center point to each vertex for each face), a set of normal (e.g., unit normal vector for each face), and sets of neighbor indexes (e.g., indexes of connected faces for each face) are provided as input to the structural descriptor 604. In some examples, the structural descriptor 604 executes a face rotate convolution and a face kernel correlation and outputs a first set of structural feature vectors ($F_{ST1}$).

Continuing, the first set of spatial feature vectors ($F_{SP1}$), the first set of structural feature vectors ($F_{ST1}$) and the sets of neighbor indexes are provided as input to a first mesh convolution block 606 in a second layer (Layer 2), which provides a second set of spatial feature vectors ($F_{SP2}$) and a second set of structural feature vectors ($F_{ST2}$) as output. The second set of spatial feature vectors ($F_{SP2}$), the second set of structural feature vectors ($F_{ST2}$) and the sets of neighbor indexes are provided as input to a second mesh convolution block 608 in a third layer (Layer 3), which provides a third set of spatial feature vectors ($F_{SP3}$) and a third set of structural feature vectors ($F_{ST3}$) as output. The third set of spatial feature vectors ($F_{SP3}$) and the third set of structural feature vectors ($F_{ST3}$) are provided as input to a fusion MLP 610, which provides a set of fused feature vectors as input to a concatenation MLP 612. The concatenation MLP 612 also receives the second set of spatial feature vectors ($F_{SP2}$) and the third set of spatial feature vectors ($F_{SP3}$) and provides a global feature vector ($F_{GLOBAL}$) for the respective segment. In some examples, each set of spatial feature vectors includes a spatial feature vector for each face in the segment model and each set of structural feature vectors includes a structural feature vector for each face in the segment model. In some examples, the global feature vector ($F_{GLOBAL}$) is a single feature vector that represents the segment features of the respective segment.

In some implementations, if the target object model 210 and the source object model 212, are each provided as point cloud models, and thus, segments in the respective sets of segments are also provided as point cloud models, the compatibility module 204 determines global feature vectors (representing segment features) using PointNet, which is introduced above. That is, each segment model is processed through PointNet to provide segment features, which are represented in a global feature vector for the respective segment. More particularly, and with reference to FIG. 5, each segment model is processed through a portion of the classification network 502 of PointNet.

Figure 7:
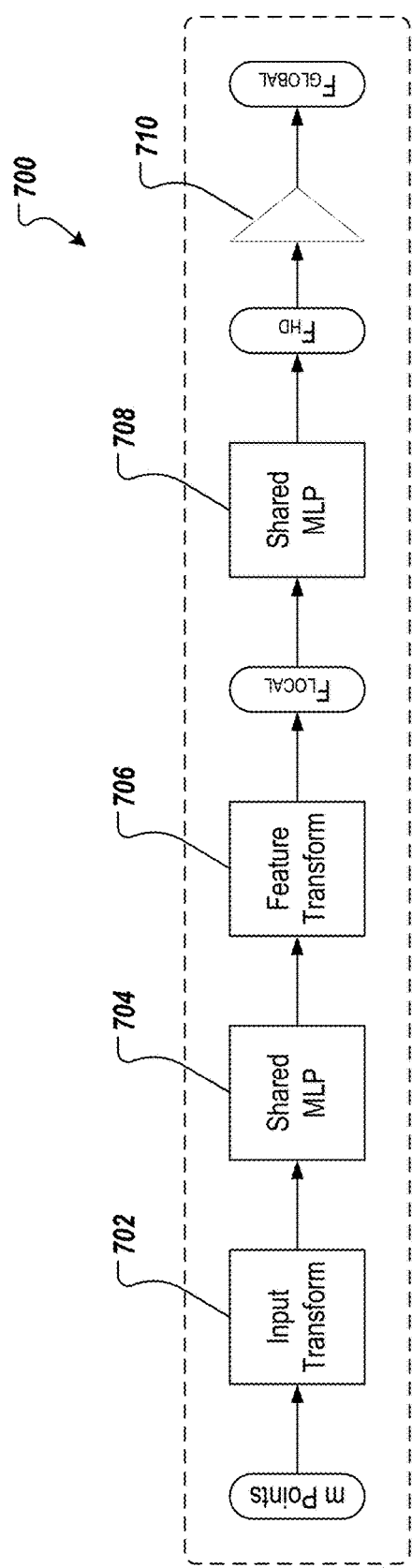
FIG. 7 depicts a portion of the second ML model of FIG. 5.

FIG. 7 depicts a portion 700 of the classification network of PointNet of FIG. 5. The example portion 700 includes components of the classification network 502 of FIG. 5, but is absent the MLP, which outputs class scores. Instead, the output of the portion 700 is a global feature vector ($F_{GLOBAL}$), which represents the segment features of a respective segment processed through the portion 700.

In further detail, input to the portion 700 is a set of m points (i.e., the points of the segment model being processed), which is processed through an input transform 702, a shared MLP 704, and a feature transform 706 to provide a set of local feature vectors ($F_{LOCAL}$) (e.g. a local feature vector for each point in the set of m points). The set of local feature vectors is processed through a shared MLP 708 to provide a set of higher-dimensional feature vectors ($F_{HD}$). The set of higher-dimensional feature vectors is processed through max pooling 710 to aggregate point features into a global feature vector ($F_{GLOBAL}$). In some examples, the global feature vector ($F_{GLOBAL}$) is a single feature vector that represents the segment features of the respective segment.

Accordingly, for each target segment in the set of target segments, a target segment global feature vector is provided (e.g., by processing the target segment through MeshNet or PointNet). Consequently, a set of target segment global feature vectors can be defined (e.g., $\mathbb{F}_T=[F_{T1}, \ldots, F_{Tq}]$, where q is the number of target segments in the set of target segments). Also, for each source segment in the set of source segments, a source segment global feature vector is provided (e.g., by processing the source segment through MeshNet or PointNet). Consequently, a set of source segment global feature vectors can be defined (e.g., $\mathbb{F}_S=[F_{S1}, \ldots, F_{Sp}]$, where p is the number of source segments in the set of source segments).

In some implementations, pairs of target segments and source segments can be defined and a compatibility score is determined for each pair. In some examples, a set of pairs includes all unique pairs that can be defined between the set of target segments and the set of source segments. For example, if the set of target segments includes q target segments and the set of source segments includes p source segments, a set of C pairs can be defined, where C=q×n, and each pair is unique. In some examples, a set of pairs includes less than all unique pairs that can be defined between the set of target segments and the set of source segments. For example, a set of c pairs can defined as a sub-set of the set of C pairs.

In some examples, the set of c pairs can include pairs, in which the target segment and the source segment are in the same class. As described above with respect to segmentation using MeshCNN or PointNet, each segment can be assigned to a class. For example, and without limitation, a first target segment ($S_{T1}$) can be assigned to the class seat back, a second target segment ($S_{T2}$) can be assigned to the class seat, a third target segment ($S_{T3}$) can be assigned to the class legs, a first source segment ($S_{S1}$) can be assigned to the class seat back, a second source segment $S_{S2}$ can be assigned to the class seat, a third source segment $S_{S3}$ can be assigned to the class legs. Here, although there are nine (9) possible unique pairs (i.e., C=9), only three (3) pairs are included in the set of pairs (i.e., c=3). In this example, the set of pairs includes: [$S_{T1}$, $S_{S1}$], [$S_{T2}$, $S_{S2}$], [$S_{T3}$, $S_{S3}$], because $S_{T1}$ and $S_{S1}$ are in the same class, $S_{T2}$ and $S_{S2}$ are in the same class, and $S_{T3}$ and $S_{S3}$ are in the same class.

As introduced above, for each pair in the set of pairs, a compatibility score is determined. For example, the compatibility score for a pair is determined based on a loss between the segment features of the target segment and the segment features of the source segment of the pair. In some examples, the loss is calculated based on the respective global feature vectors, that is, the global feature vector of the target segment and the global feature vector of the source segment in the pair.

In some implementations, the compatibility scores are each determined as a chamfer loss, also referred to as chamfer distance, which can be described as the sum of the Euclidean (L2) distances for a point in a first set (e.g., the target global feature vector) to a nearest neighbor point in a second set (e.g., the source global feature vector). To determine a chamfer distance (D), the following example relationship can be provided:

$$D(X,Y)=\Sigma_{x\in X}\min_{y\in Y}d(x,y)+\Sigma_{y\in Y}\min_{x\in X}d(x,y)$$

where X is a first global feature vector (e.g., the target segment global feature vector), x is a feature of the first global feature vector (e.g., $X=[x_1, \ldots, x_{1024}]$), Y is a second global feature vector (e.g., the source segment global feature vector), y is a feature of the first global feature vector (e.g., $Y=[y_1, \ldots, y_{1024}]$), and d is a distance between feature x and feature y.

In some implementations, the compatibility scores are each determined using a Siamese structure with a discriminative loss function to minimize the positive pairwise (with the same label) distance and maximize the negative pairwise (with different labels) distance of the respective global feature vectors. In some examples, a Siamese network (T) is provided, which computes the compatibility score between a target segment and a source segment in a pair.

Figure 8:
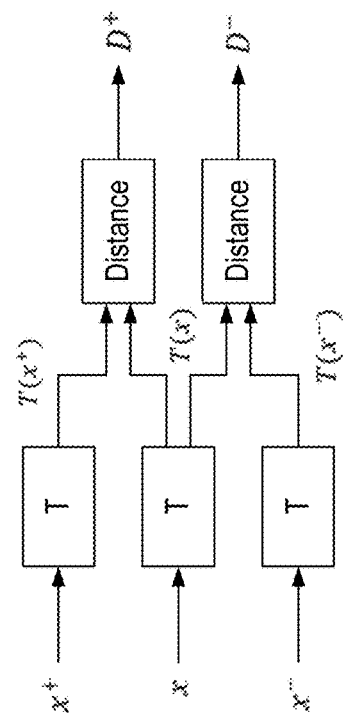
FIG. 8 depicts an example of compatibility calculation using a Siamese network in accordance with implementations of the present disclosure.

FIG. 8 depicts an example of compatibility calculation 800 using a Siamese network (T) in accordance with implementations of the present disclosure. Further, the following example relationships can be provided:

$$D^+(x,x^+)=\|T(x)-T(x^+)\|_2$$

$$D^-(x,x^-)=\|T(x)-T(x^-)\|_2$$

More particularly, a global feature vector is computed for each positive T(x) and T($x^+$) pair and negative T(x) and T($x^-$) pair and the L2 distance between positive ($D^+(x, x^+)$) and negative $D^-(x, x^-)$ pairs is determined.

Figure 9:
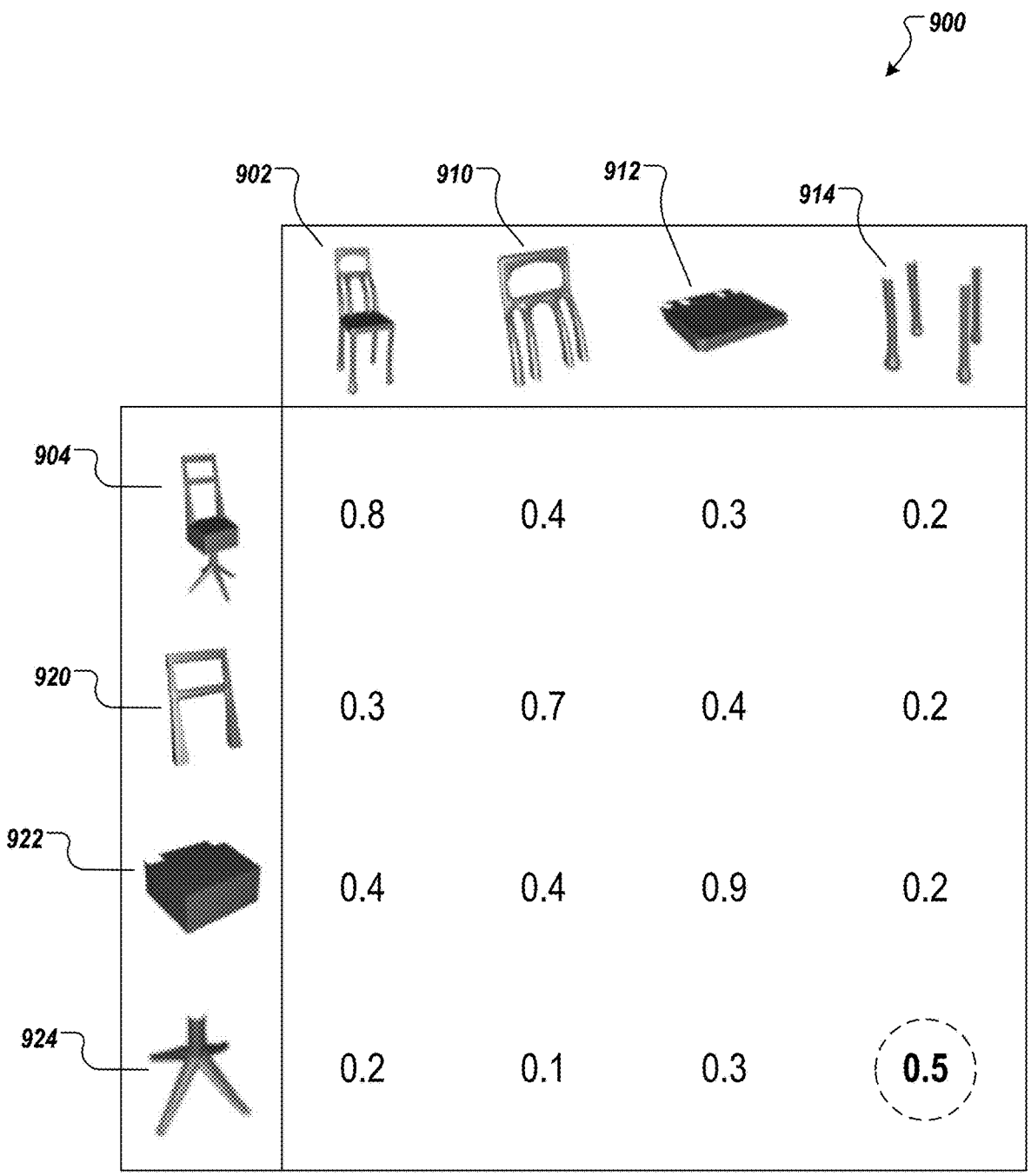
FIG. 9 depicts an example user interface (UI) summarizing compatibilities in accordance with implementations of the present disclosure.

FIG. 9 depicts an example user interface (UI) 900 summarizing compatibilities in accordance with implementations of the present disclosure. More particularly, the UI 900 depicts a compatibility matrix representing a matrix of compatibility scores. In the example of FIG. 9, a target object 902 and a source object 904 are depicted. Further, a target segment 910, a target segment 912, and a target segment 914 are depicted as identified segments of the target object 902. Also, a source segment 920, a source segment 922, and a source segment 924 are depicted as identified segments of the source object 904.

In the example of FIG. 9, compatibility scores are depicted for a set of pairs. The set of pairs include the following example pairs:

[target object 902, source object 904]
[target object 902, source segment 920]
[target object 902, source segment 922]
[target object 902, source segment 924]
[target segment 910, source object 904]
[target segment 910, source segment 920]
[target segment 910, source segment 922]
[target segment 910, source segment 924]
[target segment 912, source object 904]
[target segment 912, source segment 920]
[target segment 912, source segment 922]
[target segment 912, source segment 924]
[target segment 914, source object 904]

[target segment 914, source segment 920]
[target segment 914, source segment 922]
[target segment 914, source segment 924]

In some implementations, one or more pairs can be selected for style transfer in accordance with implementations of the present disclosure. In the example of FIG. 9, a pair that includes the target segment 914 and the source segment 924 is selected and in response, the source segment 924 is merged into the target object 902, replacing the target segment 914 to provide a stylized target object (see, e.g., the stylized target object model 214 of FIG. 2). Merging of a source segment into the target object is described in further detail herein.

In some examples, a pair can be manually selected. For example, a user viewing the UI 900 can select a pair (e.g., the user can click-on a compatibility score for a pair) and, in response, multi-dimensional style transfer is performed on the selected pair, as described in further detail herein. In some examples, a pair can be automatically selected. For example, a pair having a compatibility score that is less than a threshold compatibility score can be automatically selected. In this manner, merging of a style from the source object that is already relatively similar to the style of the target object can be avoided (e.g., avoid transfer of the source segment 922 to replace the target segment 912, which would not significantly change the style of the target object). In some examples, a pair having a compatibility score that is less than a first threshold compatibility score and that is greater than a second threshold compatibility score can be automatically selected. In this manner, merging of a style from the source object that is already relatively similar to the style of the target object (e.g., avoid transfer of the source segment 922 to replace the target segment 912, which would not significantly change the style of the target object) as well as a style that is too dissimilar (e.g., avoid transfer of the source segment 924 to replace the target segment 912) can be avoided.

In some implementations, and referring again to FIG. 2, the merge module 206 merges one or more source segments into the target object model 210 to provide the stylized target object model 214. For example, for each pair that is selected, the merge module 206 replaces the target segment of the pair with the source segment of the pair in the target object model 210 to provide the stylized target object model 214. In some implementations, the merge module 206 converts the target segment and the source segment to a uniform scale. For example, the merge module determines a scale of the target segment and adjusts a scale of the source segment to be equal to the scale of the target segment. In some examples, the scale is determined based on the dimension of the object. The scale of style component is adjusted based on the scale of the target component. In some implementations, the merge module 206 aligns a center of geometry of the source segment to a center of geometry of the target segment within the target object then deletes the target segment. In some implementations, the merge module 206 fills in any gaps between the source segment and one or more surfaces of the target object (e.g., one or more portions of the source segment are extended to intersect with the target object).

Figure 10:
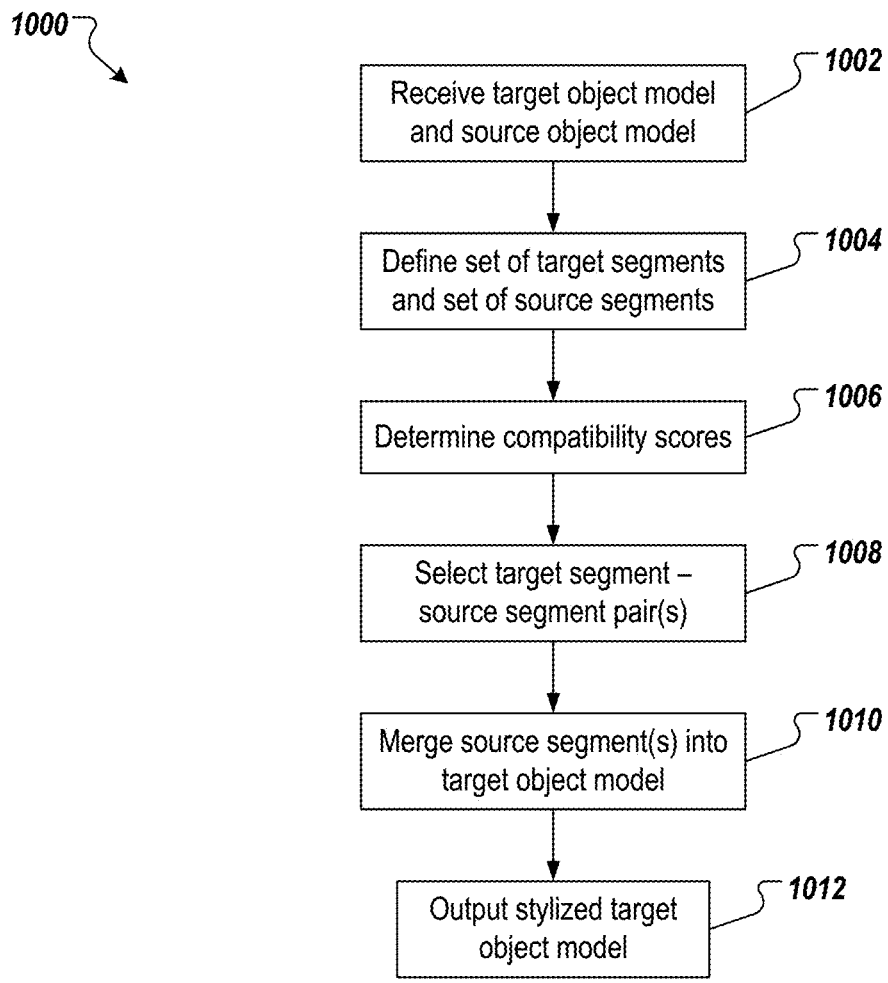
FIG. 10 depicts an example process that can be executed in accordance with implementations of the present disclosure.

FIG. 10 depicts an example process 1000 that can be executed in accordance with implementations of the present disclosure. In some implementations, the example process 1000 may be performed using one or more computer-executable programs executed using one or more computing devices.

A target object model and a source object model are received (1002). For example, and as described herein, the segmentation module 202 of FIG. 2 receives a target object model and a source object model, each as computer-readable files. A set of target segments and a set of source segments are defined (1004). For example, and as described herein, the segmentation module 202 processes each of the target object model and the source object model through a segmentation ML model (e.g., MeshCNN, PointNet) to define the set of target segments and the set of source segments, respectively.

Compatibility scores are determined (1006). For example, and as described herein, the compatibility module 204 receives the set of target segments and the set of source segments and determines a set of compatibility scores. In some examples, for each target segment in the set of target segments, a target segment global feature vector is provided (e.g., by processing the target segment through MeshNet or PointNet). Consequently, a set of target segment global feature vectors can be defined (e.g., $\mathbb{F}_T=[F_{T1}, \ldots, T_{Tq}]$, where q is the number of target segments in the set of target segments). Also, for each source segment in the set of source segments, a source segment global feature vector is provided (e.g., by processing the source segment through MeshNet or PointNet). Consequently, a set of source segment global feature vectors can be defined (e.g., $\mathbb{F}_S=[F_{S1}, \ldots, F_{Sp}]$, where q is the number of source segments in the set of source segments). For each pair in the set of target segment and source segment pairs, a compatibility score is determined. For example, the compatibility score for a pair is determined based on a loss between the segment features of the target segment and the segment features of the source segment of the pair. In some examples, the loss is calculated based on the respective global feature vectors, that is, the global feature vector of the target segment and the global feature vector of the source segment in the pair.

One or more target segment and source segment pairs are selected (1008). For example, and as described herein, a pair can be manually selected or automatically selected. For example, a user can select a pair. As another example, a pair can be automatically selected, if the pair has a compatibility score that is less than a threshold compatibility score, or has a compatibility score that is less than a first threshold compatibility score and that is greater than a second threshold compatibility score. One or more source segments are merged into the target object model (1010). For example, and as described herein, the merge module 206 merges one or more source segments into the target object model 210 to provide a stylized target object model 214. For example, for each pair that is selected, the merge module 206 replaces the target segment of the pair with the source segment of the pair in the target object model 210 to provide the stylized target object model 214. The stylized target object model is output (1012).

Implementations of the present disclosure further provide for multi-dimensional style transfer that enables a style of a source image to be at least partially applied to a target object.

Figure 11:
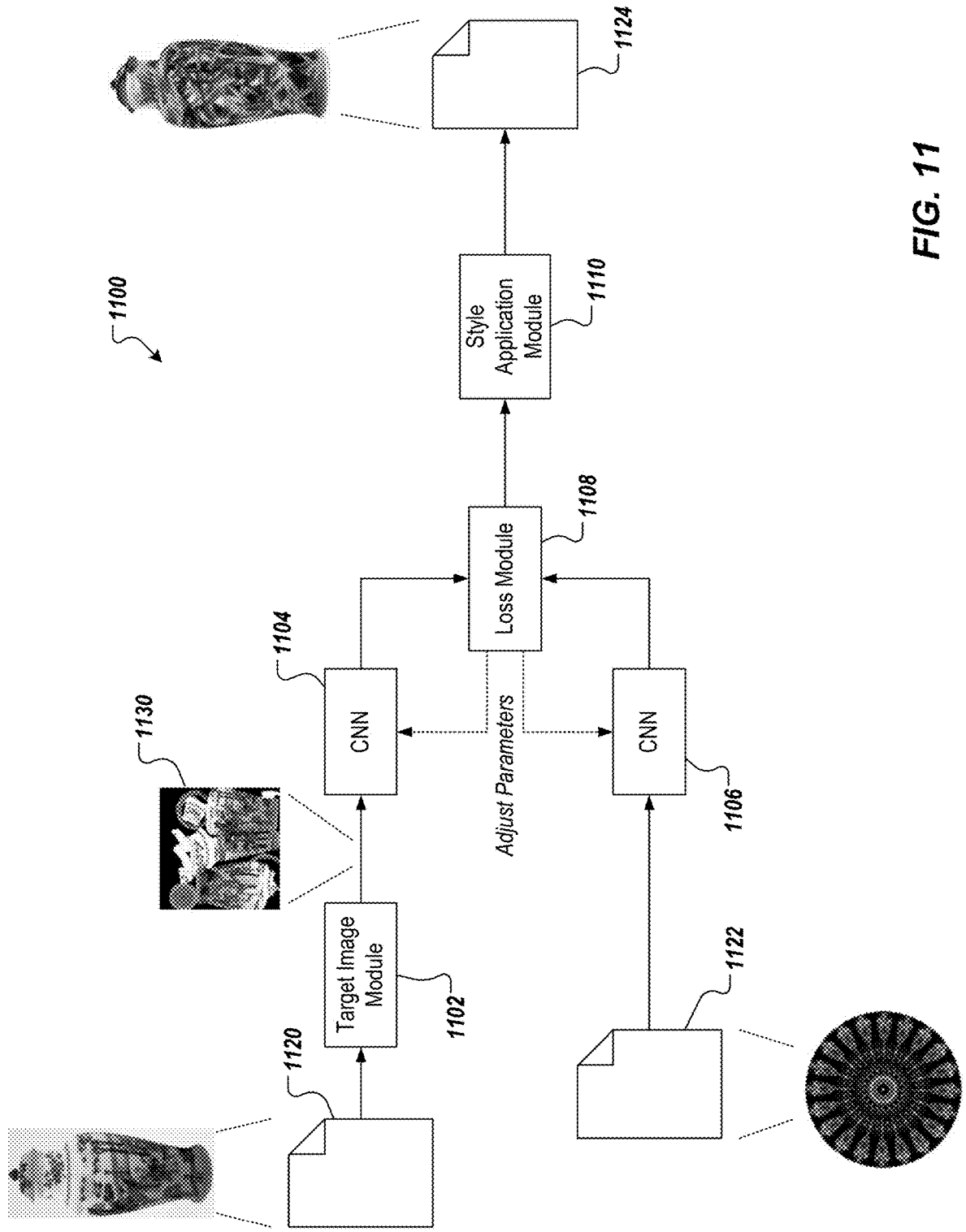
FIG. 11 depicts another conceptual architecture for multi-dimensional style transfer in accordance with implementations of the present disclosure.

FIG. 11 depicts another example conceptual architecture 1100 for multi-dimensional style transfer in accordance with implementations of the present disclosure. The example conceptual architecture 1100 can be part of an intelligent design platform and represents multi-dimensional style transfer by applying a style of an image to an object model. In further detail, the example conceptual architecture 1100 includes a target image module, a CNN 1104, a CNN 1106, a loss module 1108, and a style application module 1110. As described in further detail herein, a target object model 1120 and a style image 1120 are processed to provided a stylized target object model 1124.

In some implementations, the CNN 1104 and the CNN 1106 are each provided as an inception network. In general, the inception network is a CNN that is 27 layers deep and includes an inception layer that is a combination of multiple layers (e.g., 1×1 convolution layer, 3×3 convolution layer, 5×5 convolution layer). Output filter banks of the multiple layers are concatenated into a single output vector forming the input of the next layer. Inception networks are described in detail in *Going deeper with convolutions*, Szegedy et al., Sep. 17, 2014, *Rethinking the Inception Architecture for Computer Vision*, Szegedy et al., Dec. 11, 2015, and *Inception*-v4, *Inception-ResNet and the Impact of Residual Connections on Learning*, Szegedy et al., Aug. 23, 2016, each of which is expressly incorporated herein by reference in their entireties.

In some examples, the target object model 1120 and the stylized target object model 1124 are each digitally represented within a respective computer-readable file, which can be processed through the conceptual architecture 1100. In some examples, the target object model 1120 and the stylized target object model 1124 are each three-dimensional (3D) object models. In some examples, the style image 1122 is digitally represented within a computer-readable file, which can be processed through the conceptual architecture 1100. In some examples, the style image 1122 is a two-dimensional (2D) image.

In some implementations, the target image module 1102 processes the target object model 1120 to generate a target image 1130. For example, the target image module 1102 can rotate (e.g., 360°) the target object model 1120 to capture images from multiple perspectives of the target object model 1120 and stitch together the images to provide the target image 1130. In some examples, the target image 1130 generally represents a visual content represented by the target object model 1120.

As described in further detail herein, the style transfer of the present disclosure generates a stylized target image that is applied to the target object to provide a stylized target object, as represented in the stylized target object model 1124. In some examples, at least a portion of a style of the style image 1122 is transferred to the target image 1130 to provide the stylized image. In some examples, the style is transferred, while maintaining at least a portion of content of the target image 1130. Accordingly, this portion of style transfer can be referred to as image-to-image style transfer (e.g., 2D style transfer). An example of image-to-image style transfer is described in detail in *A Neural Algorithm of Artistic Style*, Gatys et al., Aug. 26, 2015, which is expressly incorporated herein by reference in the entirety.

In further detail, the target image 1130 is processed through the CNN 1104, which generates a target image feature representation. In some examples, the target image feature representation is provided as a target image feature map. In some examples, the target image feature representation is provided as a target image feature vector. In some implementations, the style image 1122 is processed through the CNN 1106, which generates a style image feature representation. In some examples, the style image feature representation is provided as a style image feature map. In some examples, the style image feature representation is provided as a style image feature vector.

In some implementations, the target image feature representation and the style image feature representation are each provided to the loss module 1108. The loss module 1108 processes the target image feature representation and the style image feature representation to determine a total loss. In some implementations, and as described in further detail herein, the total loss is iteratively optimized, an updated target image feature representation and an updated style image feature representation being provided for each iteration. In some examples, if an iteration achieves the optimized total loss, the updated target image feature representation provided as input to that iteration is output to the style application module 1110, and the iterations end.

In further detail, at each iteration, the loss module 1108 receives a target image feature representation and a style image feature representation. For example, at an initial iteration, the target image feature representation is provided as an initial target image feature representation and the style image feature representation is provided as an initial style image feature representation. At each subsequent iteration, the target image feature representation is provided as an updated target image feature representation and the style image feature representation is provided as an updated style image feature representation, relative to a previous iteration.

In some implementations, at each iteration, the loss module 1108 determines the total loss. In some examples, the total loss ($L_{TOTAL}$) is calculated based on the following example relationship:

$$L_{TOTAL} = \alpha L_{CONTENT} = \beta L_{STYLE}$$

where $L_{CONTENT}$ is a content loss, $L_{STYLE}$ is a style loss, $\alpha$ is a content weight, and $\beta$ is a style weight.

In some examples, the content loss represents a degree, to which a content of the target image, as represented in the target image feature representation, differs from a content of the style image, as represented in the style image feature representation. In some examples, the content loss is calculated as the mean squared error (MSE) between the target image feature representation (e.g., feature map) and the style image feature representation (e.g., feature map) of the current iteration. In some examples, the style loss represents a degree, to which a style of the style image, as represented in the style image feature representation, differs from a style of the target image, as represented in the target image feature representation. In some examples, the style loss is calculated as the MSE between a style gram matrix and a target gram matrix, determined for each of the style image feature representation and the target image feature representation, respectively.

In some implementations, the total loss is optimized over the iterations using an optimizer. An example optimizer includes, without limitation, a stochastic gradient descent (SGD) optimizer. In some examples, the total loss is optimized to achieve an expected value (e.g., 0), or within a defined degree of the expected value (e.g., ±1%).

In some implementations, optimization of the total loss includes adjusting parameters of the CNN 1104 and/or the CNN 1106 at each iteration. Accordingly, the iterative optimization of the total loss parallels a training process for training the CNN 1104 and/or the CNN 1106. In general, a CNN (ML model) is iteratively trained, where, at the outset of an iteration, one or more parameters of the CNN are adjusted, and an output (e.g., target image feature representation, style image feature representation) is generated. For each iteration, a loss value (here, total loss) is determined based on a loss function. In some examples, if the loss value does not meet an expected value (e.g., is not equal to zero, ±1%), parameters of the CNN are adjusted in a next iteration. In some instances, this process is repeated until the loss value meets the expected value.

In the context of the present disclosure, at the end of this process, the CNN is trained to provide a target image feature representation that represents at least a portion of the content of the target image 1130 and at least a portion of the style of the style image 1122. In this sense, the target image feature representation is representative of a stylized target image, which can be generated therefrom. In some examples, the stylized target image is generated by adjusting pixel values based on delta values provided from the total loss.

In accordance with implementations of the present disclosure, the style application module 1110 applies the stylized target image to the target object model 1120 to provide the stylized target object model 1124. For example, as the target image 1130 is determined from the target object model 1120, the stylized target image is applied back to the target object model 1120 to provide the stylized target object model 1124. In some examples, applying the stylized target image is achieved using UV mapping. UV mapping can be described as a 3D modeling process of projecting a 2D image to the surface of a 3D model for texture mapping. In general, UV mapping includes assigning pixels in the image to surface mappings (e.g., by programmatically copying a triangular piece of the image map and pasting it onto a triangle on the object).

Figure 12:
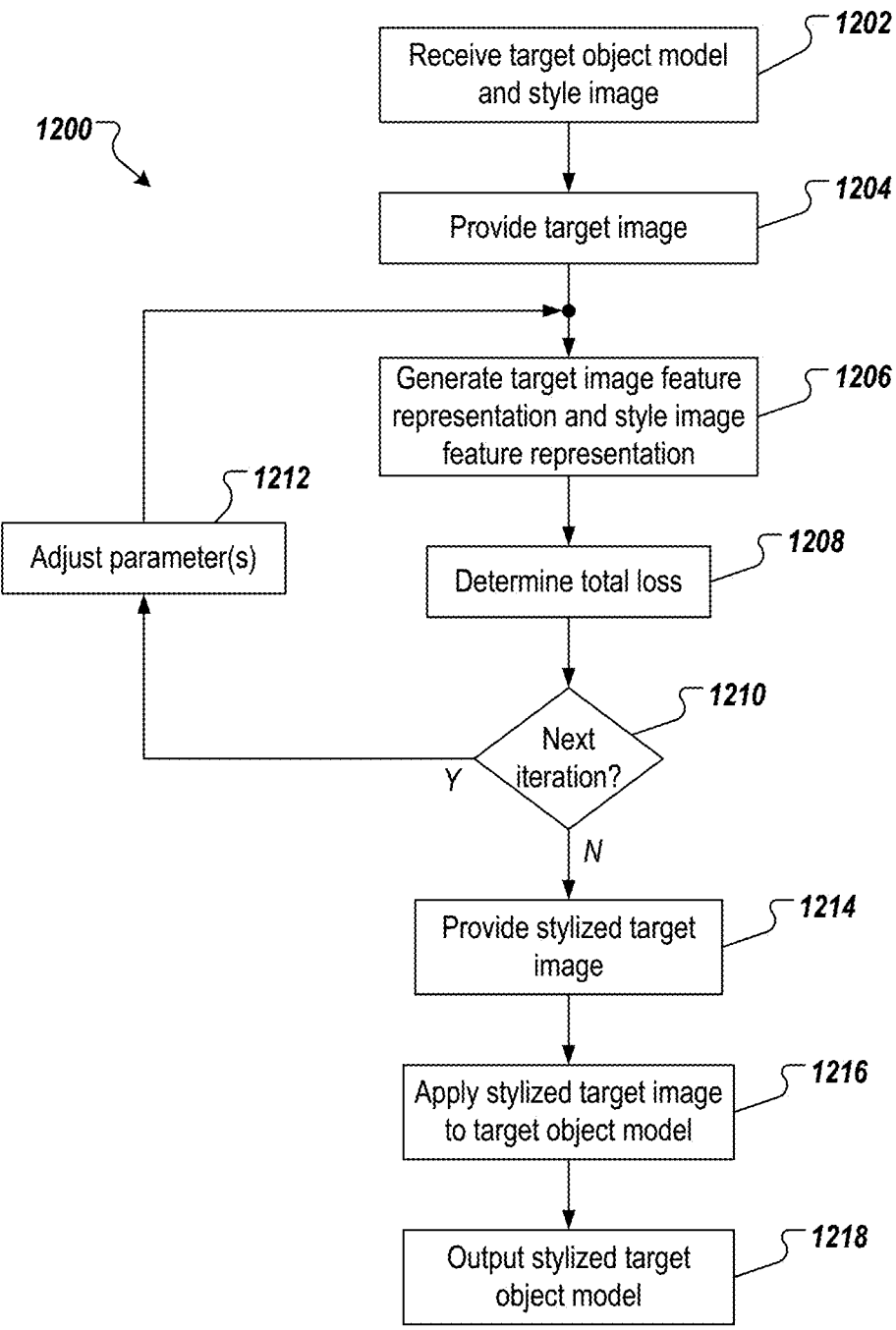
FIG. 12 depicts an example process that can be executed in accordance with implementations of the present disclosure.

FIG. 12 depicts an example process 1200 that can be executed in accordance with implementations of the present disclosure. In some implementations, the example process 1200 may be performed using one or more computer-executable programs executed using one or more computing devices.

A target object model and a style image are received (1202). For example, and as described herein, the intelligent design platform of the present disclosure receives a target object model 1120 and a style image 1122, each as a respective computer-readable file. A target image is provided (1204). For example, and as described herein, the target image module 1102 of FIG. 11 processes the target object model 1120 to provide the target image 1130. A target image feature representation and a source image feature representation are generated (1206). For example, and as described herein, the CNN 1104 processes the target image 1130 to provide the target image feature representation (e.g., feature map) and the CNN 1106 processes the style image 1122 to provide the source image feature representation (e.g., feature map).

A total loss is determined (1208). For example, and as described herein, the loss module 1108 determines the total loss based on the target image feature representation and the source image feature representation. It is determined whether a next iteration is to be performed (1210). For example, and as described herein, the total loss can be compared to an expected value and, if the total loss is not equal to or within a defined range of the expected value, it can be determined that a next iteration is to be performed. If a next iteration is to be performed, one or more parameters are adjusted (1212), and the example process 1200 loops back. For example, and as described herein, one or more parameters of the CNN 1104 and/or the CNN 1106 can be adjusted for generation of the target image feature representation and/or the source image feature representation during the next iteration.

If a next iteration is not to be performed, a stylized target image is provided (1214). For example, and as described herein, the style application module 1110 can provide the stylized target image based on the target image feature representation or the style image feature representation from the last iteration of total loss optimization. The stylized target image is applied to the target object model (1216). For example, and as described herein, the style application module 1110 applies the stylized target image to the target object model to provide the stylized target object model 1124. The stylized target object model is output (1218). For example, and as described herein, the style application module 1110 outputs the stylized target object model 1124 as a computer-readable file.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for multi-dimensional style transfer between digital models, the method comprising:

receiving a target object model comprising data representative of a target object;

receiving a source object model comprising data representative of a source object;

defining a set of target segments by processing the target object model through a segmentation machine learning (ML) model, and a set of source segments by processing the source object model through the segmentation ML model;

for each target segment and source segment pair in a set of target segment and source segment pairs, generating a compatibility score that represents a degree of similarity between a target segment and a source segment of a respective target segment and source segment pair, the compatibility score calculated based on a global feature representation of the target segment and a global feature representation of the source segment of the respective target segment and source segment pair, each global feature representation determined from a ML model;

selecting at least one source segment for style transfer based on compatibility scores; and merging the at least one source segment into the target object model to replace a respective at least one target segment within the target object model and providing a stylized target object model.

2. The method of claim 1, wherein the target object model and the source object model are provided as mesh models, the segmentation ML model comprises MeshCNN, and the ML model comprises MeshNet.

3. The method of claim 1, wherein the target object model and the source object model are provided as point cloud models, the segmentation ML model comprises PointNet, and the ML model comprises a portion of PointNet.

4. The method of claim 1, wherein compatibility scores are each determined as a chamfer distance between the global feature representation of the target segment and the global feature representation of the source segment of the respective target segment and source segment pair.

5. The method of claim 1, wherein compatibility scores are each determined using a Siamese network that processes the global feature representation of the target segment and the global feature representation of the source segment of the respective target segment and source segment pair.

6. The method of claim 1, wherein selecting at least one source segment for style transfer based on compatibility scores comprises:

providing a compatibility matrix for display to a user in a user interface; and receiving user input indicating selection of the at least one source segment.

7. The method of claim 1, wherein selecting at least one source segment for style transfer based on compatibility scores comprises comparing each compatibility score to one or more thresholds to effect respective comparisons, the at least one source segment being automatically selected based on a comparison.

8. The method of claim 1, further comprising:
determining a stylized image from a target image and a style image based on content loss and style loss; and
selectively applying the stylized image to one or more of the target object model and the stylized target object model.

9. The method of claim 8, wherein determining a stylized image from a target image and a style image comprises, for each iteration of multiple iterations:
generating a target image feature representation using a first inception network;
generating a source image feature representation using a second inception network;
determining a total loss based on the content loss and the style loss determined based on the target image feature representation and the source image feature representation; and
selectively executing a next iteration based on the total loss, the next iteration comprising adjusting one or more parameters of one or more of the first inception network and the second inception network.

10. One or more non-transitory computer-readable storage media coupled to one or more processors and having instructions stored thereon which, when executed by the one or more processors, cause the one or more processors to perform operations for multi-dimensional style transfer between digital models, the operations comprising:
receiving a target object model comprising data representative of a target object;
receiving a source object model comprising data representative of a source object;
defining a set of target segments by processing the target object model through a segmentation machine learning (ML) model, and a set of source segments by processing the source object model through the segmentation ML model;
for each target segment and source segment pair in a set of target segment and source segment pairs, generating a compatibility score that represents a degree of similarity between a target segment and a source segment of a respective target segment and source segment pair, the compatibility score calculated based on a global feature representation of the target segment and a global feature representation of the source segment of the respective target segment and source segment pair, each global feature representation determined from a ML model;
selecting at least one source segment for style transfer based on compatibility scores; and
merging the at least one source segment into the target object model to replace a respective at least one target segment within the target object model and providing a stylized target object model.

11. The one or more non-transitory computer-readable storage media of claim 10, wherein the target object model and the source object model are provided as mesh models, the segmentation ML model comprises MeshCNN, and the ML model comprises MeshNet.

12. The one or more non-transitory computer-readable storage media of claim 10, wherein the target object model and the source object model are provided as point cloud models, the segmentation ML model comprises PointNet, and the ML model comprises a portion of PointNet.

13. The one or more non-transitory computer-readable storage media of claim 10, wherein compatibility scores are each determined as a chamfer distance between the global feature representation of the target segment and the global feature representation of the source segment of the respective target segment and source segment pair.

14. The one or more non-transitory computer-readable storage media of claim 10, wherein compatibility scores are each determined using a Siamese network that processes the global feature representation of the target segment and the global feature representation of the source segment of the respective target segment and source segment pair.

15. The one or more non-transitory computer-readable storage media of claim 10, wherein selecting at least one source segment for style transfer based on compatibility scores comprises:
providing a compatibility matrix for display to a user in a user interface; and
receiving user input indicating selection of the at least one source segment.

16. The one or more non-transitory computer-readable storage media of claim 10, wherein selecting at least one source segment for style transfer based on compatibility scores comprises comparing each compatibility score to one or more thresholds to effect respective comparisons, the at least one source segment being automatically selected based on a comparison.

17. The one or more non-transitory computer-readable storage media of claim 10, wherein operations further comprise:
determining a stylized image from a target image and a style image based on content loss and style loss; and
selectively applying the stylized image to one or more of the target object model and the stylized target object model.

18. The one or more non-transitory computer-readable storage media of claim 10, wherein determining a stylized image from a target image and a style image comprises, for each iteration of multiple iterations:
generating a target image feature representation using a first inception network;
generating a source image feature representation using a second inception network;
determining a total loss based on the content loss and the style loss determined based on the target image feature representation and the source image feature representation; and selectively executing a next iteration based on the total loss, the next iteration comprising adjusting one or more parameters of one or more of the first inception network and the second inception network.

19. A system, comprising:
one or more processors; and
a computer-readable storage device coupled to the one or more processors and having instructions stored thereon which, when executed by the one or more processors, cause the one or more processors to perform operations for multi-dimensional style transfer between digital models, the operations comprising:
receiving a target object model comprising data representative of a target object;

receiving a source object model comprising data representative of a source object;

defining a set of target segments by processing the target object model through a segmentation machine learning (ML) model, and a set of source segments by processing the source object model through the segmentation ML model;

for each target segment and source segment pair in a set of target segment and source segment pairs, generating a compatibility score that represents a degree of similarity between a target segment and a source segment of a respective target segment and source segment pair, the compatibility score calculated based on a global feature representation of the target segment and a global feature representation of the source segment of the respective target segment and source segment pair, each global feature representation determined from a ML model;

selecting at least one source segment for style transfer based on compatibility scores; and merging the at least one source segment into the target object model to replace a respective at least one target segment within the target object model and providing a stylized target object model.

20. The system of claim 19, wherein the target object model and the source object model are provided as mesh models, the segmentation ML model comprises MeshCNN, and the ML model comprises MeshNet.

21. The system of claim 19, wherein the target object model and the source object model are provided as point cloud models, the segmentation ML model comprises PointNet, and the ML model comprises a portion of PointNet.

22. The system of claim 19, wherein compatibility scores are each determined as a chamfer distance between the global feature representation of the target segment and the global feature representation of the source segment of the respective target segment and source segment pair.

23. The system of claim 19, wherein compatibility scores are each determined using a Siamese network that processes the global feature representation of the target segment and the global feature representation of the source segment of the respective target segment and source segment pair.

24. The system of claim 19, wherein selecting at least one source segment for style transfer based on compatibility scores comprises:

providing a compatibility matrix for display to a user in a user interface; and receiving user input indicating selection of the at least one source segment.

25. The system of claim 19, wherein selecting at least one source segment for style transfer based on compatibility scores comprises comparing each compatibility score to one or more thresholds to effect respective comparisons, the at least one source segment being automatically selected based on a comparison.

26. The system of claim 19, wherein operations further comprise:

determining a stylized image from a target image and a style image based on content loss and style loss; and selectively applying the stylized image to one or more of the target object model and the stylized target object model.

27. The system of claim 19, wherein determining a stylized image from a target image and a style image comprises, for each iteration of multiple iterations:

generating a target image feature representation using a first inception network;

generating a source image feature representation using a second inception network;

determining a total loss based on the content loss and the style loss determined based on the target image feature representation and the source image feature representation; and selectively executing a next iteration based on the total loss, the next iteration comprising adjusting one or more parameters of one or more of the first inception network and the second inception network.

* * * * *